United States Patent
Ando

(10) Patent No.: US 8,988,693 B2
(45) Date of Patent: Mar. 24, 2015

(54) INFORMATION PROCESSING SYSTEM, INFORMATION PROCESSING APPARATUS, INFORMATION PROCESSING METHOD, AND INFORMATION PROCESSING PROGRAM

(71) Applicant: Mitsuo Ando, Fukuoka (JP)

(72) Inventor: Mitsuo Ando, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 58 days.

(21) Appl. No.: 13/826,283

(22) Filed: Mar. 14, 2013

(65) Prior Publication Data

US 2013/0242331 A1 Sep. 19, 2013

(30) Foreign Application Priority Data

Mar. 19, 2012 (JP) .................................. 2012-062790
Nov. 28, 2012 (JP) .................................. 2012-259804

(51) Int. Cl.
G06F 3/12 (2006.01)
G06K 15/00 (2006.01)
H04N 1/00 (2006.01)

(52) U.S. Cl.
CPC ......... *H04N 1/0097* (2013.01); *H04N 1/00973* (2013.01); *H04N 2201/0094* (2013.01)
USPC ........ 358/1.13; 358/1.14; 358/1.15; 358/1.16

(58) Field of Classification Search
USPC ............... 358/1.13, 1.15, 1.14, 1.6, 1.9, 1.16; 717/170, 168, 177, 172, 100, 103, 12, 717/127, 171; 726/26, 27, 28, 29, 30, 31, 1, 726/3, 7, 6; 709/321, 327, 201, 203, 212, 709/217, 227, 238
See application file for complete search history.

(56) References Cited

U.S. PATENT DOCUMENTS

| 7,313,702 | B2* | 12/2007 | Shimada et al. ............... 713/184 |
| 7,812,978 | B2 | 10/2010 | Ando et al. |
| 8,310,703 | B2* | 11/2012 | Nuggehalli et al. ......... 358/1.15 |
| 2003/0051069 | A1* | 3/2003 | Iida ............................. 709/321 |

(Continued)

FOREIGN PATENT DOCUMENTS

| JP | 2006-079211 | 3/2006 |
| JP | 2006-109411 | 4/2006 |

OTHER PUBLICATIONS

U.S. Appl. No. 13/604,925, filed Sep. 6, 2012.

*Primary Examiner* — Ngon Nguyen
(74) *Attorney, Agent, or Firm* — IPUSA, PLLC

(57) ABSTRACT

A disclosed information processing system includes an apparatus and an information processing apparatus including a service information memory unit storing service identification information identifying a service provided for the apparatus and program identification information for identifying a program required to be installed in the apparatus, a correspondence setup unit storing the apparatus identification information for identifying the apparatus and the service identification information upon a receipt of a usage request in which the apparatus identification information and the service identification information are designated, a communication unit requesting installation of a program related to the program identification information stored in the service information memory unit, and a program administrating unit returning the program related to the program identification information designated in the acquisition request, in response to the acquisition request for the program from the apparatus, wherein the program causes the apparatus to send information related to the apparatus.

15 Claims, 19 Drawing Sheets

(56) References Cited

U.S. PATENT DOCUMENTS

2004/0205261 A1* 10/2004 Osada ............................ 710/8
2007/0229873 A1* 10/2007 Kato ............................ 358/1.14
2011/0176169 A1* 7/2011 Kashioka .................... 358/1.15
2011/0299110 A1* 12/2011 Jazayeri et al. .............. 358/1.15

* cited by examiner

FIG.6

| SERVICE NAME | SERVICE CONTENTS | CALLBACK URL | USAGE SETUP URL | USAGE PLUGIN |
|---|---|---|---|---|
| ScanStop | .... | .... | .... | ScanStopD |

| USER NAME | PASSWORD | ADMINISTRATOR NAME | CARD ID | |
|---|---|---|---|---|
| A | ... | A | ... | ... |
| B | ... | A | ... | ... |
| C | ... | A | ... | ... |
| D | ... | A | ... | ... |
| .. | .. | .. | .. | .. |

USAGE SETUP SCREEN — 560

| USER | UPPER LIMIT NUMBER OF SHEETS | CURRENT NUMBER OF SHEETS |
|---|---|---|
| A | UPPER LIMIT [ 100 ] SHEETS | 0 SHEETS |
| B | UPPER LIMIT [ 100 ] SHEETS | 0 SHEETS |
| C | UPPER LIMIT [ 50 ] SHEETS | 0 SHEETS |
| : | : | : |

561 — SETUP

| USER NAME | UPPER LIMIT NUMBER OF SHEETS | CURRENT NUMBER OF SHEETS |
|---|---|---|
| A | 100 | 0 |
| B | 100 | 0 |
| C | 50 | 0 |
| : | : | : |

FIG.15

| APPARATUS NUMBER | SERVICE NAME | ... |
|---|---|---|
| 12345 | ScanStop | ... |
| 67890 | ScanStop | ... |
| .. | .. | .. |

| WEB PLUGIN NAME | APPARATUS NUMBER | STATE | ... |
|---|---|---|---|
| ScanStopD | 12345 | NOT INSTALLED | ... |
| | 67890 | NOT INSTALLED | ... |
| .. | .. | .. | .. |

| APPARATUS NUMBER | APPARATUS NAME | LOCATION | IP ADDRESS | PORT NUMBER | ADMINISTRATOR NAME |
|---|---|---|---|---|---|
| 12345 | AAA | FUKUOKA 2ND FLOOR | xxxxx | ... | A |
| 11111 | BBB | EBINA BUILDING | FW | | A |
| 67890 | CCC | OMORI BUILDING 2ND FLOOR | yyyyy | ... | A |
| .. | | .. | .. | .. | .. |

Scan APPLICATION IS PROHIBITED TO BE USED

APPLICATION CANNOT BE USED BECAUSE THE NUMBER
OF SCANNED SHEETS REACHED THE UPPER LIMIT

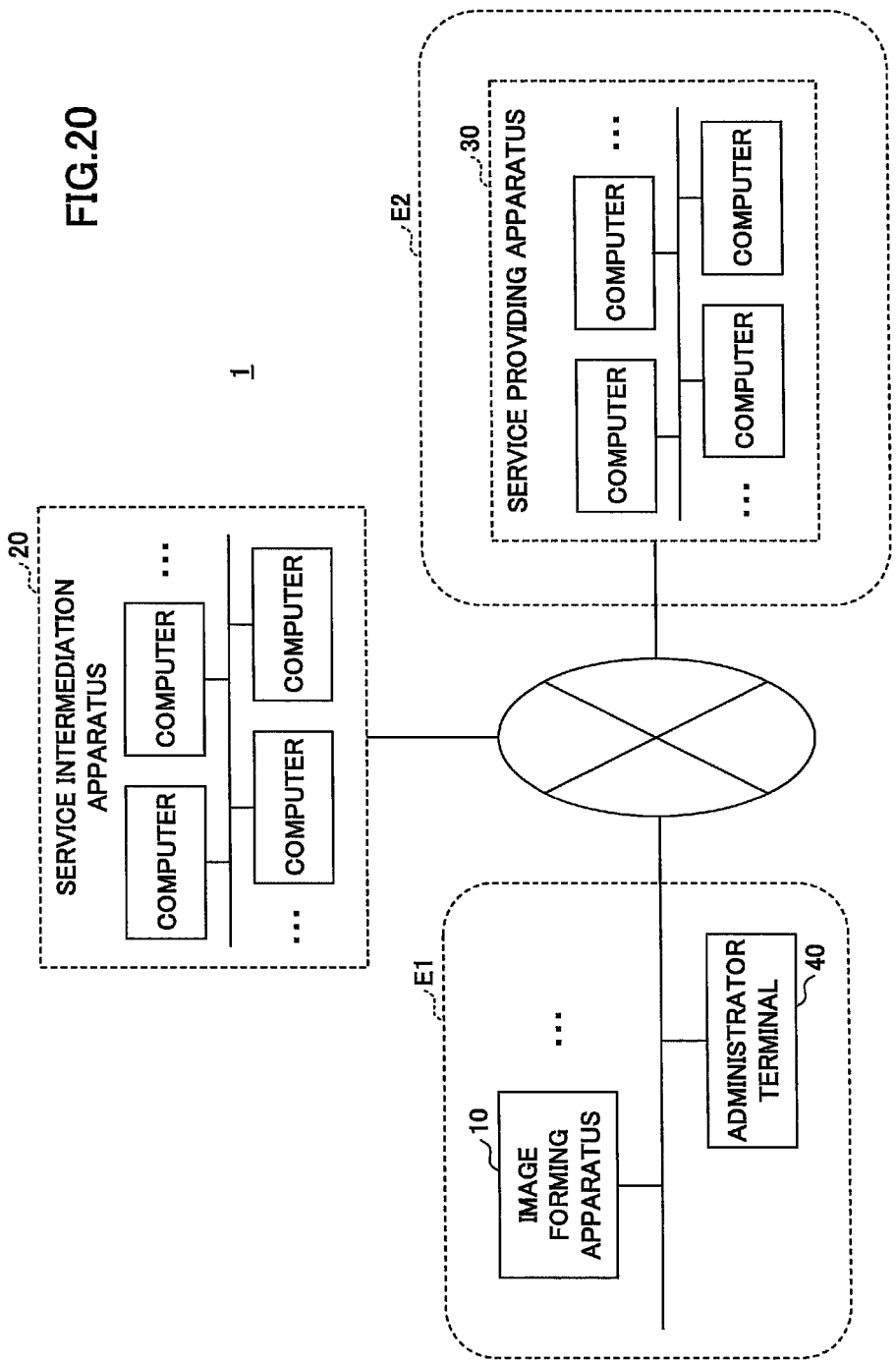

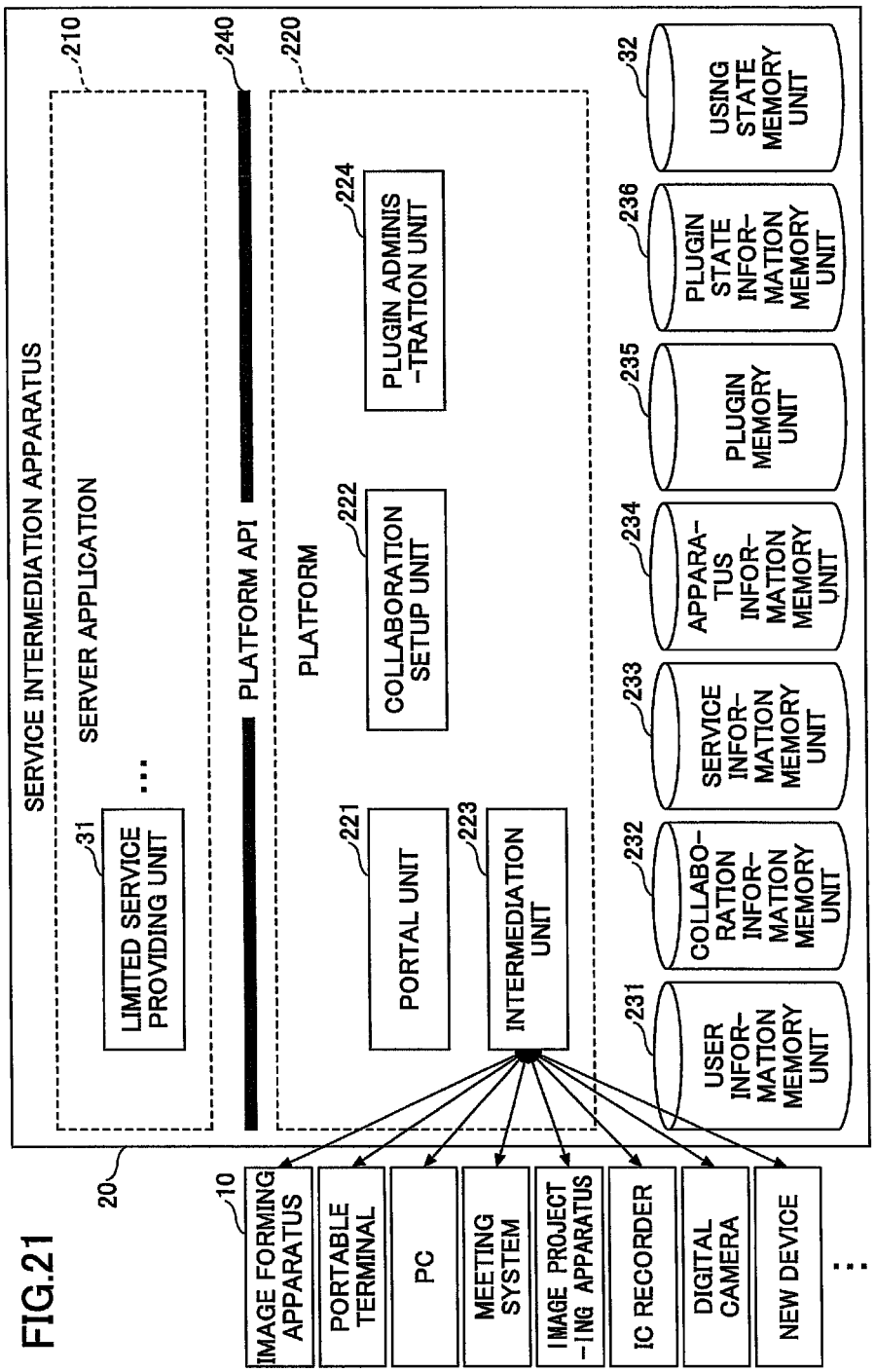

US 8,988,693 B2

INFORMATION PROCESSING SYSTEM, INFORMATION PROCESSING APPARATUS, INFORMATION PROCESSING METHOD, AND INFORMATION PROCESSING PROGRAM

BACKGROUND OF THE INVENTION

1. Field of the Invention

The present invention generally relates to an information processing system, an information processing apparatus, an information processing method, and an information processing program.

2. Description of the Related Art

There is an image forming apparatus which can achieve function enhancement by installing an application program (For example, Patent Document 1).

Meanwhile, in recent years, cloud computing service attracts attention. If service for an image forming apparatus is provided as a service via a network such as cloud computing service, a likelihood of providing an added value to a user of the image forming apparatus can be expected.

An application program for an image forming apparatus may be started to run upon various events occurring in the image forming apparatus or may be modified to change contents of processes by the application program depending on the events. It seems difficult to detect all the events in a service provided via the network and immediately control the image forming apparatus in response to the detected event in consideration of communication load, the existence of firewalls and so on.

Such a situation commonly occurs in various apparatuses in a manner similar to that of the image forming apparatus.

Patent Document 1: Japanese Laid-Open Patent Application No. 2006-079211

SUMMARY OF THE INVENTION

Accordingly, embodiments of the present invention provide a novel and useful mode in association between service provided via a network and an apparatus, solving one or more of the problems discussed above.

One aspect of the embodiments of the present invention may be to provide an information processing system including an apparatus and an information processing apparatus connected to the apparatus via a network, including a service information memory unit that stores service identification information identifying a service provided for the apparatus and program identification information for identifying a program required to be installed in the apparatus when the service is provided while the service identification information and the program identification information correspond; a correspondence setup unit that stores the apparatus identification information for identifying the apparatus and the service identification information while the apparatus identification information and the service identification information correspond in a correspondence information memory unit, in response to a receipt of a usage request in which the apparatus identification information and the service identification information are designated; a communication unit that requests installation, to the apparatus related to the apparatus identification information designated in the usage request, of a program related to the program identification information stored in the service information memory unit while the service identification information and the program identification information correspond; and a program administrating unit that returns the program related to the program identification information designated in the acquisition request, in response to the acquisition request for the program from the apparatus which receives a request for the installation, wherein the program causes the apparatus to send information related to the apparatus.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 6 illustrates an exemplary structure of a service information memory unit;

FIG. 9 illustrates an exemplary structure of a user information memory unit;

FIG. 12 illustrates an exemplary usage setup screen of a service screen with limited scan usage;

FIG. 13 illustrates a structural example of a usage state memory unit;

FIG. 15 illustrates an exemplary structure of a collaboration information memory unit;

FIG. 16 illustrates an exemplary structure of a plugin state information memory unit;

FIG. 17 illustrates an exemplary structure of an apparatus information memory unit;

FIG. 19 is an exemplary display of a usage limitation screen.

FIG. 20 illustrates an exemplary structure including a service intermediation apparatus comprised of a plurality of computers and a service providing apparatus comprised of a plurality of computers;

FIG. 21 illustrates a secondary exemplary functional structure of a service intermediation apparatus of a embodiment of the present invention.

DETAILED DESCRIPTION OF THE PREFERRED EMBODIMENTS

Figure 1:
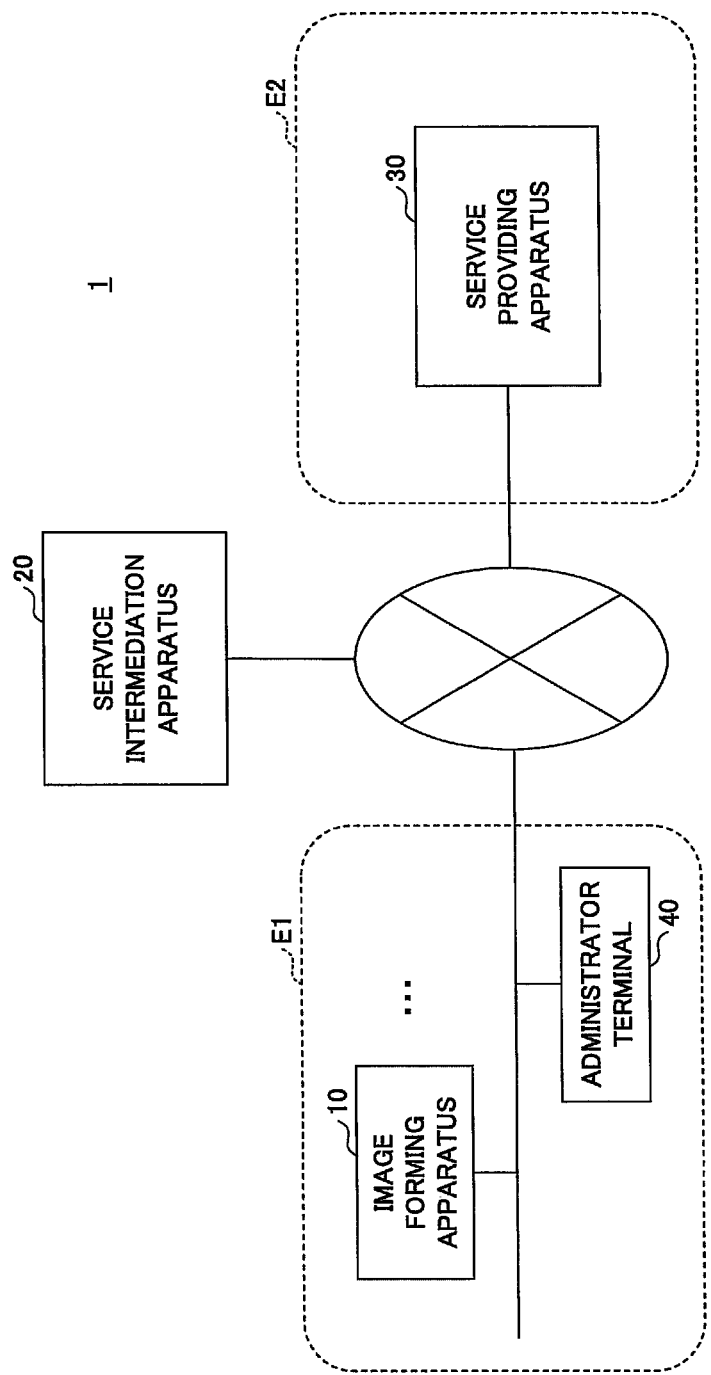
FIG. 1 illustrates an exemplary structure of an information processing system of an embodiment.

A description is given below, with reference to FIG. 1 through FIG. 21 of embodiments of the present invention. Where the same reference symbols are attached to the same parts, repeated description of the parts is omitted.

REFERENCE SYMBOLS TYPICALLY DESIGNATE AS FOLLOWS:

1: information processing system
10: image forming apparatus
11: controller
12: scanner
13: printer
14: modem
15: operations panel
16: network interface
17: SD card slot
20: service intermediation apparatus
30: service providing apparatus
31: limited service providing unit;
32: usage state memory unit;
40: administrator terminal;
41: browser unit;
80: SD card;
111: CPU;
112: RAM;
113: ROM;
114: HDD;
115: NVRAM;
121: apparatus authorizing unit;
122: Web starting unit;
123: scan executing unit;
124: relay unit;
125: system control unit;
200: drive device;
201: recording medium;
202: auxiliary memory device;
203: memory device;
204: CPU;
205: interface device;
221: portal unit;
222: collaboration setup unit;
223: intermediation unit;
224: plugin administration unit;
231: user information memory unit;
232: collaboration information memory unit;
233: service information memory unit;
234: apparatus information memory unit;
235: plugin memory unit;
236: plugin state information memory unit; and
B: Bus.

Hereinafter, an embodiment of the present invention is described based on the figures. FIG. 1 illustrates an exemplary structure of an information processing system 1 of the embodiment. In the information processing system 1, a service intermediation apparatus 20 is connected to a user environment E1 and a service providing environment E2 via a communication network such as a Local Area Network (LAN), an intranet, the Internet or the like.

The service intermediation apparatus 20 is a computer intermediating the user environment E1 and the service providing environment E2. Hereinafter, a function or a service provided by the service intermediation apparatus 20 is referred to as an "intermediation service". For example, the service intermediation apparatus 20 provides an intermediation service as a cloud service in the Internet. Instead, the service intermediation apparatus 20 may be installed inside an enterprise of the user environment E1 like a private cloud computing service.

The service providing environment E2 is a system environment in an organization which provides a service via a network. The service providing environment E2 includes a service providing apparatus 30. The service providing apparatus 30 provides a predetermined service via the network. For example, the predetermined service is provided by a process in which a program installed in the service providing apparatus 30 causes a CPU of the service providing apparatus 30 to execute. Within the embodiment, the service providing apparatus provides a "service with limited scan usage". The service with limited scan usage is to limit the number of sheets to be scanned in the image forming apparatus 10 in the user environment E1 to be the upper limit value or smaller for each user. The service providing apparatus 30 may be installed in the user environment E1 in a manner similar to the service intermediation apparatus 20. Said differently, the service providing environment E2 may be included in the user environment E1.

The user environment E1 is a system environment in a user enterprise or the like of the image forming apparatus 10. In the user environment E1, one or more image forming apparatuses 10 are connected to an administrator terminal 40 via a network such as a Local Area Network (LAN) or the like.

The image forming apparatus 10 is a multifunction peripheral that can realize two or more functions among printing, scanning, copying, and a FAX transmission with one casing. However, the image forming apparatus 10 may have one function among printing, scanning, copying, and the FAX transmission. Within the embodiment, the image forming apparatus 10 has at least the function of scanning.

The administrator terminal 40 is used by an administrator of the image forming apparatus 10 in the user environment E1. An example of the administrator terminal 40 is a personal computer (PC), a personal digital assistant (PDA), a tablet-type terminal, a smart phone, a mobile phone, or the like.

Figure 2:
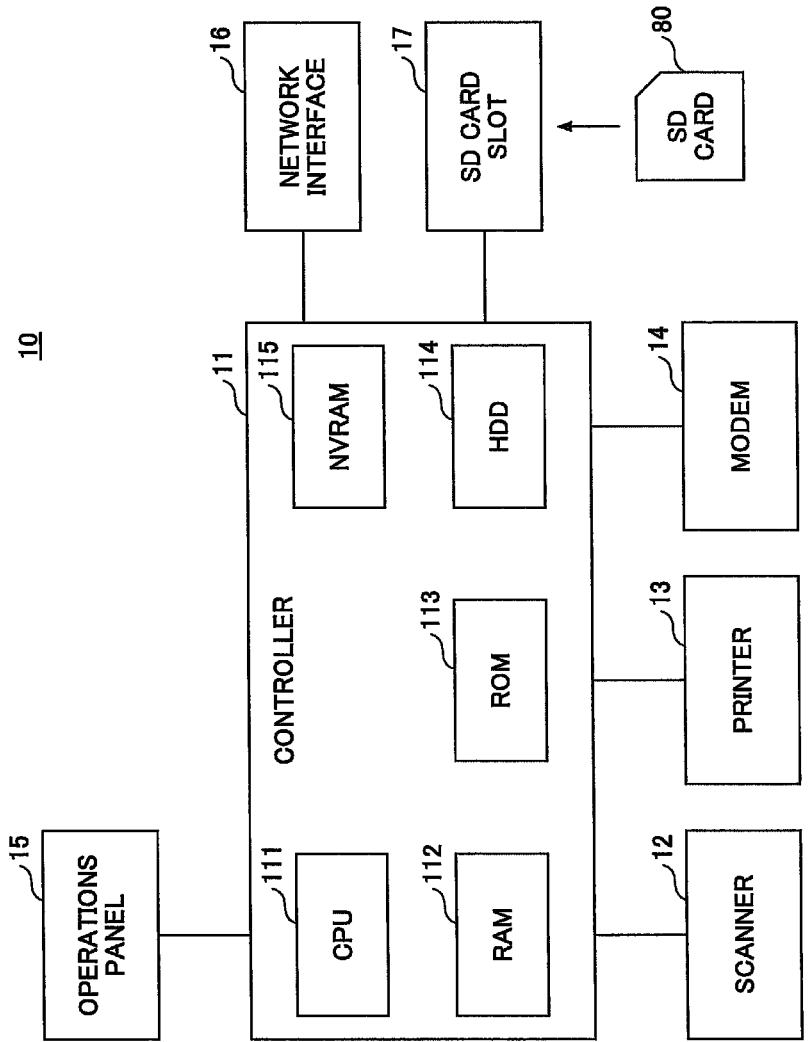
FIG. 2 illustrates an exemplary hardware structure of an image forming apparatus of an embodiment of the present invention.

FIG. 2 illustrates an exemplary hardware structure of the image forming apparatus of the embodiment. Referring to FIG. 2, the image forming apparatus 10 includes hardware such as a controller 11, a scanner 12, a printer 13, a modem 14, an operations panel 15, a network interface 16, an SD card slot 17, or the like.

The controller 11 includes a CPU 111, a RAM 112, a ROM 113, an HDD 114, an NVRAM 115, and so on. Various programs and data used by the programs are stored in the ROM 113. The RAM 112 is used as a memory area for loading the programs, a work area for the loaded programs, or the like. The CPU 111 demonstrates various functions by executing the programs loaded into the RAM 112. The HDD 114 records programs, various data used by the programs, or the like. The NVRAM 115 stores various setup information or the like.

The scanner 12 is hardware (an image reading unit) for reading image data from an original (an original manuscript). The printer 13 is hardware (a printing unit) for printing print data on a print paper. The modem 14 is hardware for connecting the image forming apparatus 10 to a telecommunication line (not illustrated) and is used for sending and receiving the image data with fax communications. The operations panel 15 is hardware provided with an input unit for receiving an input from the user such as a button, a display unit such as a liquid crystal panel, or the like. The network interface 16 is hardware for connecting the image forming apparatus 10 to a wired or wireless network such as a LAN. The SD card slot 17 is used to read a program recorded in an SD card 80. Said differently, not only the programs stored in the ROM 113 but also the programs stored in the SD card 80 may be loaded into the RAM 112 and executed by the image forming apparatus 10. The SD card 80 may be substituted for another recording medium such as a CD-ROM and a universal serial bus (USB) memory. The recording medium taking a place corresponding to the SD card 80 may be any recording medium. In this case, the SD card slot 17 may be replaced by hardware depending on kinds of the recording media.

Figure 3:
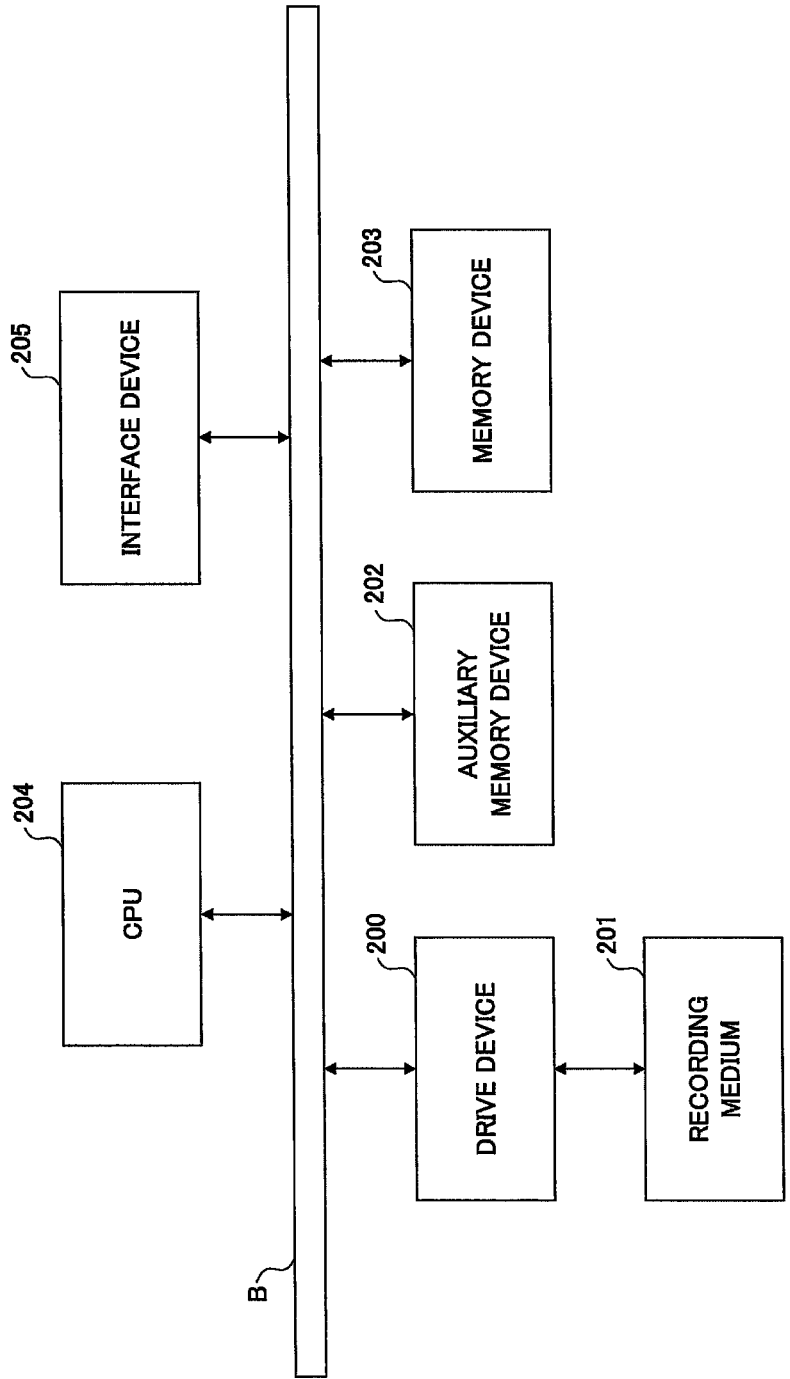
FIG. 3 illustrates an exemplary hardware structure of an service intermediation apparatus of the embodiment of the present invention.

FIG. 3 illustrates an exemplary hardware structure of the service intermediation apparatus 20 of an embodiment of the present invention. The service intermediation apparatus 20 includes a drive device 200, an auxiliary memory device 202, a memory device 203, a CPU 204 and an interface device 205, which are mutually connected by a bus B.

A program realizing processes in the service intermediation apparatus 20 is supplied by a recording medium 201 such as a CD-ROM. When the recording medium 201 with the program recorded on it is installed in the drive device 200, the program is installed in the auxiliary memory device 202 via the drive device 200 from the recording medium 201. However, the program may not always be installed from the recording medium 201 and may be downloaded from another computer via the network. The auxiliary memory device 202 stores necessary files, data and so on in addition to the installed program.

The memory device 203 reads out the program from the auxiliary memory device 202 when the program is to be invoked and stores the read program in the memory device 203. The CPU 204 realizes a function related to the service intermediation apparatus 20 in conformity with the program stored in the memory device 203. The interface device 205 is used as an interface for connecting to the network.

The service providing apparatus 30 may have the hardware illustrated in FIG. 3.

Figure 4:
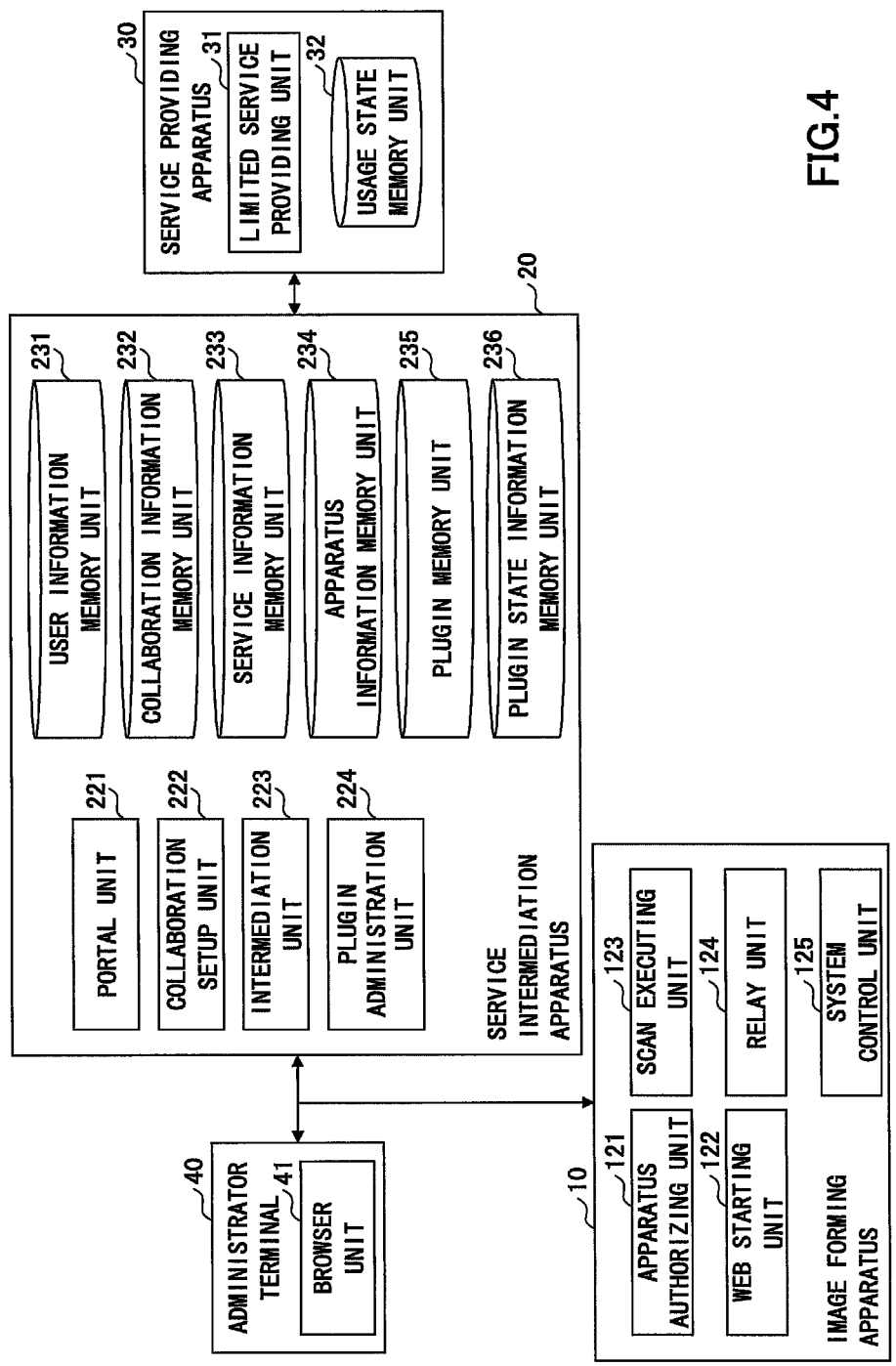
FIG. 4 illustrating an exemplary functional structure of the information processing system of an embodiment.

FIG. 4 illustrates an exemplary functional structure of the information processing system of the embodiment.

Referring to FIG. 4, the image forming apparatus 10 includes an apparatus authorizing unit 121, a Web starting unit 122, a scan executing unit 123, a relay unit 124, a system control unit 125, or the like. These units are realized when the program installed in the image forming apparatus 10 is executed by the CPU 111.

The apparatus authorizing unit 121 controls a login into the service intermediation apparatus 20 by a user of the image forming apparatus 10. The user who has succeeded to log into the service intermediation apparatus 20 can operate the image forming apparatus 10.

The Web starting unit 122 performs management of a lifecycle of a program module (hereinafter a "Web plugin") required to be installed into the image forming apparatus 10 along with a start of using a service provided by the service providing apparatus 30 or the like. For example, the Web starting unit 122 performs downloading, installing, starting, stopping, deleting (uninstalling), updating, or the like.

The scan executing unit 123 controls execution of a scan job.

The relay unit 124 controls communication between the image forming apparatus 10 and an intermediation unit 223 of the service intermediation apparatus 20. For example, the relay unit 124 relays communication between other functional portions (program modules) inside the image forming apparatus 10 and the intermediation unit 223.

The system control unit 125 is a software group for controlling various hardware of the image forming apparatus 10.

The service intermediation apparatus 20 includes a portal unit 221, a collaboration setup unit 222, the intermediation unit 223, a plugin administration unit 224, and so on. These units are realized when one or more programs installed in the service intermediation apparatus 20 are executed by the CPU 204. The service intermediation apparatus 20 uses a user information memory unit 231, a collaboration information memory unit 232, a service information memory unit 233, an apparatus information memory unit 234, a plugin memory unit 235, a plugin state information memory unit 236, or the like. The user information memory unit 231, the collaboration information memory unit 232, the service information memory unit 233, the apparatus information memory unit 234, the plugin memory unit 235, the plugin state information memory unit 236, and so on can be realized by the auxiliary memory device 202, a memory device or the like connected to the service intermediation apparatus 200 via the network, or the like.

The user information memory unit 231 stores information related to a registered user who uses the intermediation service. The service information memory unit 233 stores information related to a service provided by the service providing apparatus 30. The collaboration information memory unit 232 stores information necessary for collaboration between the image forming apparatus 10 and the service provided by the service providing unit 30. The apparatus information memory unit 234 stores attribute information (hereinafter, referred to as "apparatus information") of the image forming apparatuses 10 in the user environment E1. The plugin memory unit 235 stores various plugins. The Web plugin may be registered from the service providing environment E2 or from an organization (e.g., a software vendor) that is completely different from the service providing environment E2. The plugin state information memory unit 236 stores an installation destination, information indicative of the state of the Web plugin in the installation destination, or the like.

The portal unit 221 functions as a portal (an interface) of the intermediation service. The collaboration setup unit 222 performs a setup process for causing the image forming apparatus 10 and the service provided by the service providing apparatus 30 to collaborate (for associating the image forming apparatus 10 and the service provided by the service providing apparatus 30) or the like. A result of the setup process performed by the collaboration setup unit 222 is stored in the collaboration information memory unit 232.

The intermediation unit 223 performs intermediation between the image forming apparatus 10 and the limited service providing unit 31 of the service providing apparatus 30 or the like. For example, the intermediation unit 223 reports a request for installing a Web plugin necessary for using the service to the image forming apparatus 10, subjected to the service with limited scan usage provided by the service providing apparatus 30. In the image forming apparatus 10 subjected to the service with limited scan usage, the number of scanned sheets is limited by the service with limited scan usage. Further, the intermediation unit 223 transfers information, which is sent to the image forming apparatus 10 by the Web plugin, to the service providing apparatus 30. Within the embodiment, the Web plugin used by the service with limited scan usage causes the image forming apparatus 10 to perform transmission of the number of the scanned sheets or the like.

The plugin administration unit 224 acquires the Web plugin related to an acquisition request for the Web plugin from the image forming apparatus 10, to which an installation request is reported by the intermediation unit 223, and returns the Web plugin related to the acquisition request to the image forming apparatus 10.

The service providing apparatus 30 includes a limited service providing unit 31, a usage state memory unit 32, and so on. The limited service providing unit 31 is realized when a program installed on the service providing apparatus 30 is executed by a CPU of the service providing apparatus 30. Further, the usage state memory unit 32 is realized by an auxiliary memory device of the service providing apparatus 30, a memory device connected to the service providing apparatus 30 via the network, or the like.

The limited service providing unit 31 performs a process for providing the service with limited scan usage. The usage state memory unit 32 stores the number of scanned sheets for each user in the image forming apparatus 10 subjected to the service with limited scan usage.

The administrator terminal 40 includes a browser unit 41. For example, the browser unit 41 is realized by an ordinary Web browser program causing a CPU of the administrator terminal 40 to execute. Therefore, the Web browser unit 41 realizes a function similar to that of an ordinary Web browser.

Figure 5:
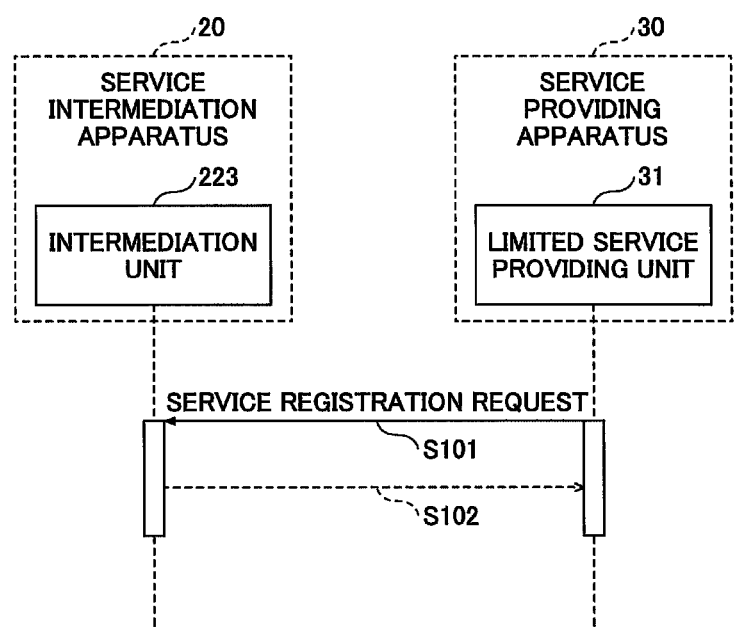
FIG. 5 is a sequence chart for explaining an exemplary registration process of a service with limited scan usage.

Hereinafter, the procedure by the information processing system 1 is described. FIG. 5 is a sequence chart for describing an example of a process of registering the service with limited scan usage. In order to provide a service by using the service intermediation apparatus 20, it is necessary to register information (hereinafter, "service information") related to the provided service in the service intermediation apparatus 20. FIG. 5 describes an order of the process related to the registration.

In step S101, the limited service providing unit 31 of the service providing apparatus 30 sends a registration request for registering the service with limited scan usage to the service intermediation apparatus 20. The registration request is performed at a time when the program causing the service providing apparatus 30 to function as the limited service providing unit 31 is initially run. In the registration request, service information including a service name, a service content, a callback Uniform Resource Locator (URL), a usage setup URL, a usage plugin name, or the like.

The service name is an example of identification information of the service with limited scan usage. Within the embodiment, the service name of the service with limited scan usage is "ScanStop". The service contents are a character string (description) indicating the contents of the service with limited scan usage provided by the limited service providing unit 31. The callback URL is a URL at the transfer destination of information sent from the image forming apparatus 10, into which the Web plugin designated by the usage plugin name is installed. The usage setup URL is allocated for a setup screen for setting at a time of starting to use the fax receipt report service (hereinafter, referred to as a "usage setup screen"). The usage plugin name is a program name of the Web plugin used by a service related to the registration request (here, the service with limited scan usage). The service with limited scan usage uses the Web plugin having a program name of "ScanStopD". Hereinafter, "ScanStopD" designates the Web plugin having the program name and a specific function. A plurality of plugin names of a plurality of Web plugins may be designated in the usage plugin name. Said differently, the plurality of Web plugins may be used for one service.

Before the registration request in step S101, list information of the Web plugins stored in the plugin memory unit 235 of the service intermediation apparatus 20 may be presented to the service providing apparatus 30. Based on the list information, the Web plugin suitable for the service with limited scan usage may be selected. Further, ScanStopD may be developed by a person other than a provider of the service with limited scan usage.

When a service registration request is received by the service intermediation apparatus 20, the intermediation unit 223 stores (registers) the service information designated in the registration request in the service information memory unit 233.

FIG. 6 illustrates an exemplary structure of a service information memory unit 233. Referring to FIG. 6, the service information memory unit 233 stores the service name, the service contents, the callback URL, the usage URL, the usage plugin name, or the like. In the items of the service names, the service contents, the subscription event lists, the callback URLs, the usage setup URLs and so on, values designated in the registration request are registered. FIG. 6 illustrates a state where the service information related to the service with limited scan usage is stored.

Subsequently, the intermediation unit 223 returns a response indicative of normal registration in the service information memory unit 233 to the limited service providing unit 31 (step S102). As described, the service with limited scan usage is unveiled by the service intermediation apparatus 20.

As described, a person who provides a service using the Web plugin is required to register the service information of the service in the service intermediation apparatus 20.

On the other hand, in the user environment E1 requiring usage of the service with limited scan usage, an operation of using the service with limited scan usage is performed by using the administrator terminal 40 by the administrator. The process performed by the operation is described next.

Figure 7:
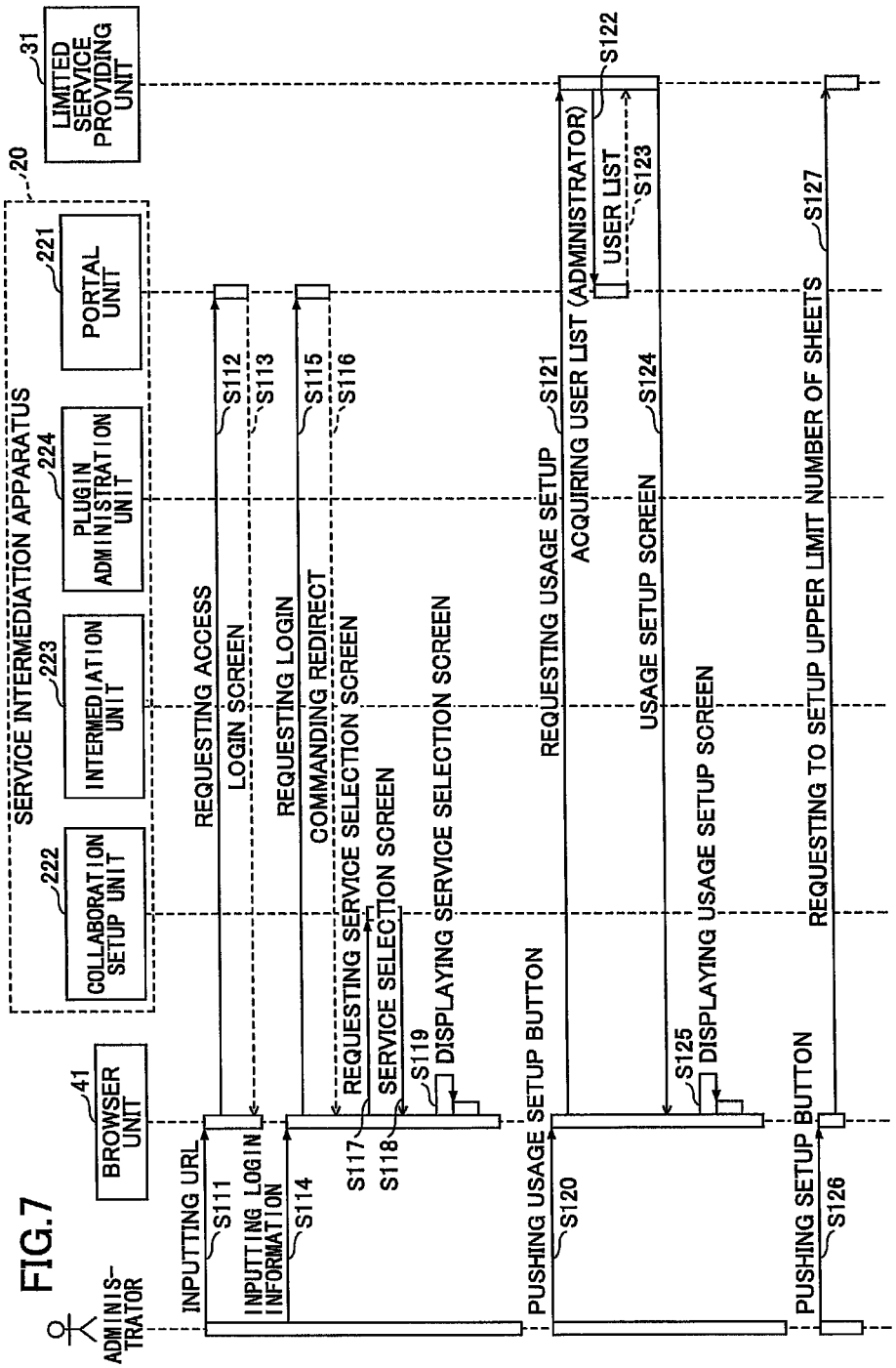
FIG. 7 is a sequence chart for describing an exemplary process performed in association with a start of using a service with limited scan usage.
Figure 8:
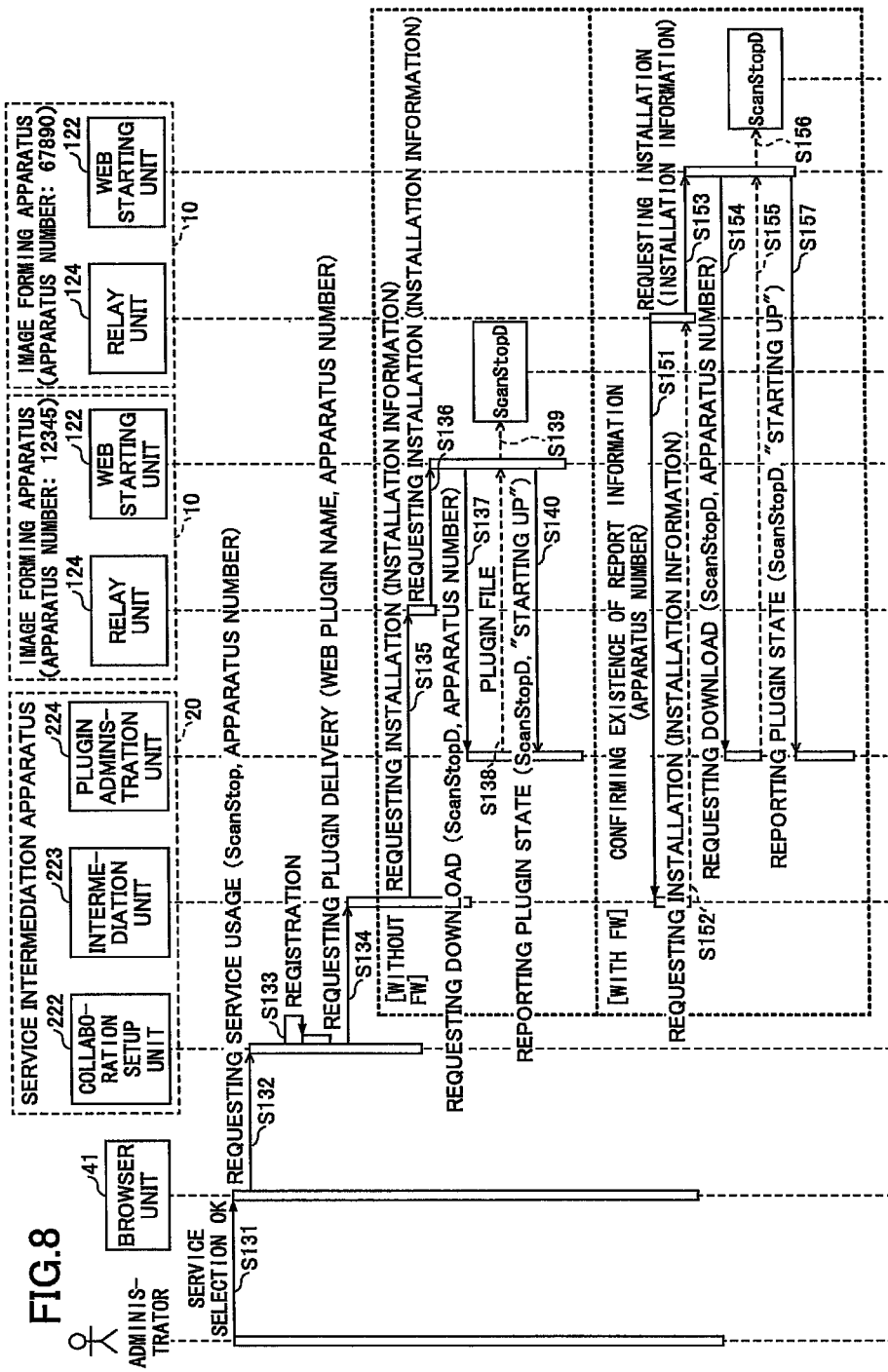
FIG. 8 is a sequence chart for describing an exemplary process performed in association with a start of using a service with limited scan usage.

FIGS. 7 and 8 are sequence charts for describing an exemplary process performed in association with a start of using the service with limited scan usage. The processes of FIGS. 7 and 8 are performed out of synchronism with the process illustrated in FIG. 5 after the process illustrated in FIG. 5.

For example, the administrator inputs a URL corresponding to the intermediation service into a browser screen displayed by the browser unit 41 of the administrator terminal 40 in step S111. Subsequently, the browser unit 41 sends an HTTP request indicative of an access request to the URL in step S112. The portal unit 221 of the service intermediation apparatus 20 sends a response including HTML data for displaying a login screen upon receipt of the access request in step S113. When the browser unit 41 receives the response, the browser unit 41 causes the login screen to be displayed on a display device of the administrator terminal 40 based on the HTML data included in the response.

When login information such as the user name and the password is input by the administrator in the login screen in step S114, the browser unit 41 sends a login request (an authorization request) as the administrator to the portal unit 221 of the service intermediation apparatus 20 in step S115. The portal unit 221 refers to the user information memory unit 231 to authorize the user name and the password designated in the login request.

FIG. 9 illustrates an exemplary structure of the user information memory unit 231. Referring to FIG. 9, the user information memory unit 231 includes a user name, a password, an administrator name, a card ID, and so on. The administrator name may be the user name of the administrator of the image forming apparatus 10 used by the user. Referring to FIG. 9, the administrator of the image forming apparatus 10 has the user name A and also the administrator name A.

The card ID is identification information (ID) used to log into the image forming apparatus. Said differently, in the user environment E1, magnetic cards, IC cards, or the like, in which different card IDs are recorded are respectively delivered to the users. The user gets authorization for login by setting the card in a card reader connected to the image forming apparatus at a time of logging into the image forming apparatus 10. However, the user may log into the image forming apparatus 10 by inputting other information such as the user name, the password, or the like.

The portal unit 221 determines that the authorization by the administrator is successful when the user name and the password designated by the login request are stored in the user information memory unit 231, and the "administrator name" corresponding to the user name is the same as the user name.

In a case where the authorization as the administrator is successful, the portal unit 221 returns a redirect command in which a URL for a screen (hereinafter, referred to as a "service selection screen") for enabling the user to select a service to be used is a destination of the redirect. For example, the redirect command includes a session ID generated in association with the user name of the user (the login user), who has successfully logged in, as a parameter designated at a time of the redirection.

When the browser unit 41 receives the redirect command, the browser unit 41 sends an acquisition request for the service selection screen to the URL of the redirect destination in step S117. The apparatus browser unit 41 stores a session ID included in the redirect command into, for example, the RAM 112 or the HDD 114. This session ID is designated when the Web browser unit 41 requests in or after step S117.

Subsequently, the collaboration setup unit 222 of the service intermediation apparatus 20 returns a response including HTML data for displaying the service selection screen in response to the acquisition request for the service selection screen in step S118. When the HTML data for the service selection screen are generated, the collaboration setup unit 222 generates the HTML data so that the list of the service names registered in the service information memory unit 233 (see FIG. 6) is included as an option.

When the browser unit 41 receives the response, the browser unit 41 causes the service selection screen to be displayed on the display device of the administrator terminal 40 based on the HTML data included in the response in step S119.

Figure 10:
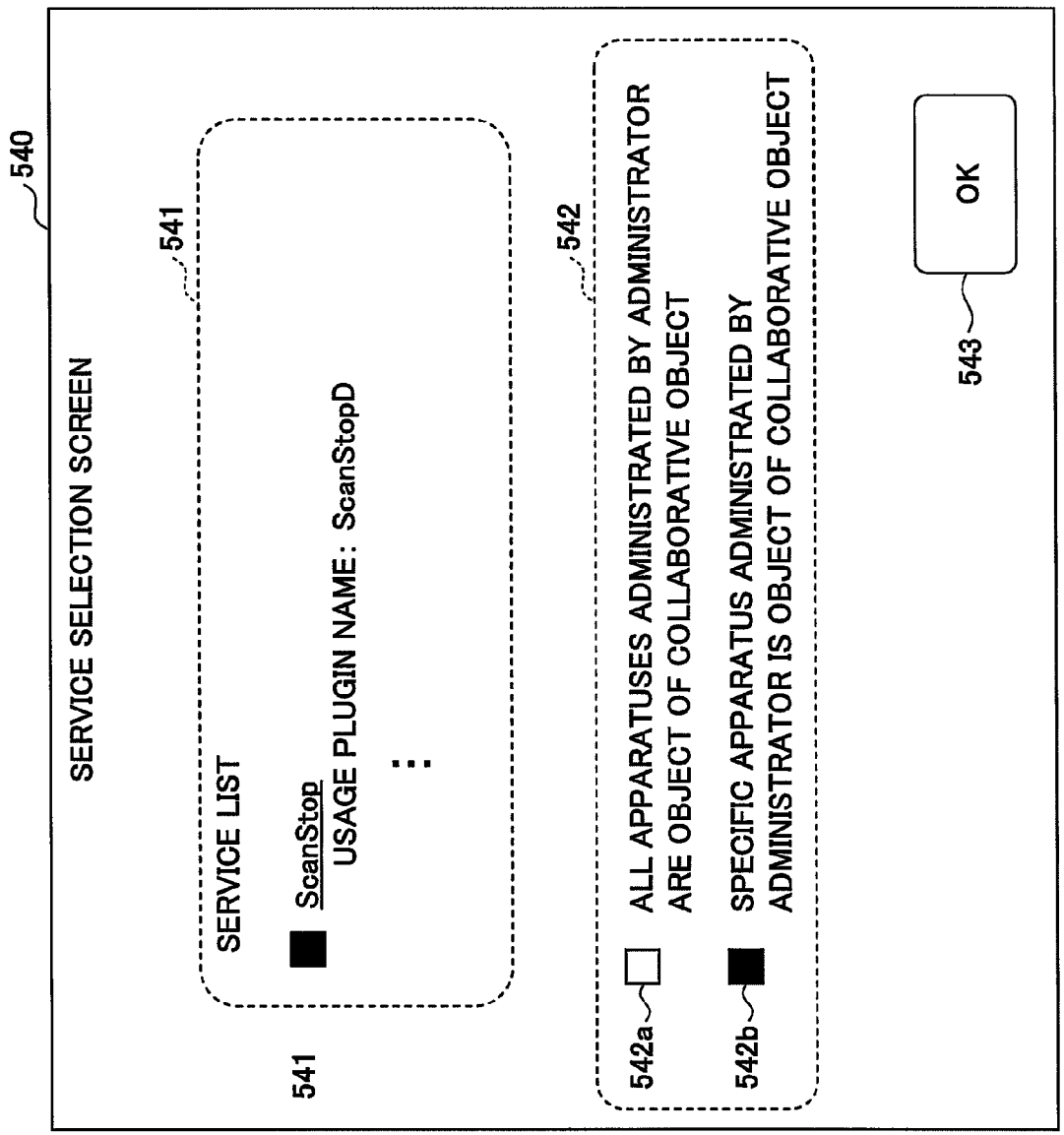
FIG. 10 is an exemplary display on a service selection screen.

FIG. 10 is an exemplary display of the service selection screen. Referring to FIG. 10, the service selection screen 540 includes a service selection area 541, a collaboration apparatus designation area 542, an OK button, and so on.

The service selection area 541 is provided for the administrator to select the service used by the user environment E1. Said differently, the service selection area 541 includes check buttons respectively for the service names. The usage plugin names are displayed under the services, respectively. By using the service, the administrator notified that the new Web plugin is installed in the image forming apparatus 10.

The collaboration apparatus designation area 542 is provided to cause the administrator to select whether the collaborative object with the service selected in the service selection area 541 is all apparatuses (the image forming apparatuses 10) administered by the administrator or a specific apparatus administered by the administrator.

When any one of check buttons is selected in the service selection area 541, the browser unit 41 causes a screen including detailed information corresponding to the check button to be displayed. For example, when the check box corresponding to the service with limited scan usage is selected, a detailed service with limited scan usage as illustrated in FIG. 11 is displayed as a popup screen as illustrated in FIG. 11.

Figure 11:
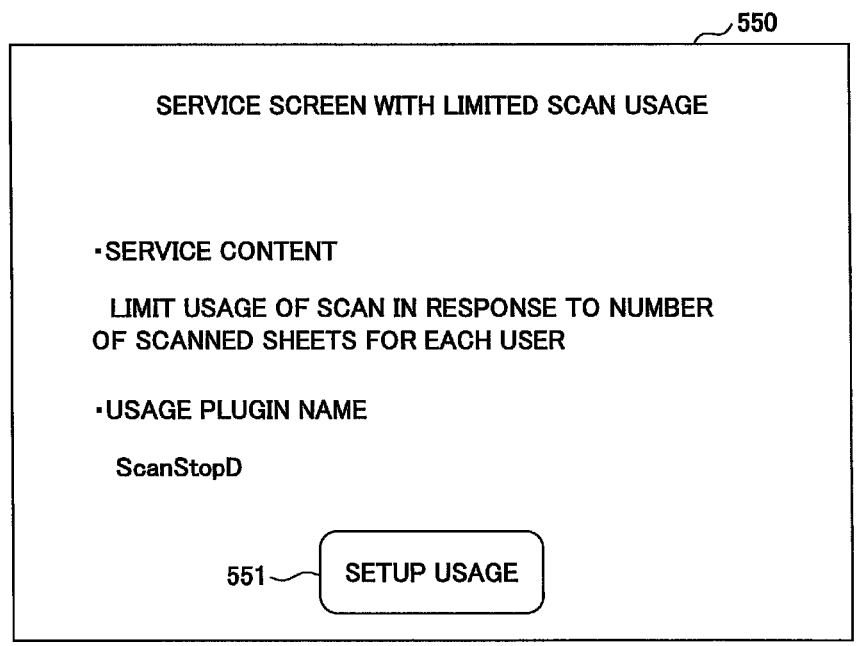
FIG. 11 illustrates an exemplary display of a detailed service screen with limited scan usage.

FIG. 11 illustrates an exemplary display of the detailed service screen with limited scan usage. Referring to FIG. 11, the detailed service screen with limited scan usage 550 includes the service name and the usage plugin name of the service with limited scan usage. This information is acquired from the service information memory unit 233.

The detailed service screen with limited scan usage 550 further includes a usage setup button 551. The usage setup button 551 is provided to set the service with limited scan usage.

When the usage setup button 551 is pressed by the administrator in step S120, the browser unit 41 sends a usage setup request of the service with limited scan usage, in which the administrator name (a login user name to the intermediation service) is designated in step S121. The usage setup request is sent to a URL associated with the usage setup button 551. The URL is the usage setup URL in the service information memory unit 233. Therefore, the usage setup request is sent to the limited service providing unit 31 of the service providing apparatus 30.

When the limited service providing unit 31 receives a usage setup request, the limited service providing unit 31 designates the administrator name designated by the usage setup request and sends an acquisition request for a user name list to the portal unit 221 of the service intermediation apparatus 20 in step S122. The portal unit 221 acquires the user name list corresponding to the designated administrator name from the user information memory unit 231 and returns the acquired user name list to the limited service providing unit 31 in step S123.

The limited service providing unit 31 generates HTML data for displaying the usage setup screen for the service with limited scan usage based on the returned user name list in step S123. The limited service providing unit 31 returns a response including the generated HTML data to the browser unit 41 in step S124. When the browser unit 41 receives the response, the browser unit 41 causes the usage setup screen to be displayed on the display device of the administrator terminal 40 based on the HTML data included in the response in step S125.

FIG. 12 illustrates an exemplary usage setup screen of the service screen with limited scan usage. Referring to FIG. 12, the upper limit number of sheets can be set for each user by the usage setup screen 560. The administrator sets the upper limit value of scanned sheets (upper limit number of sheets) for each user. Within the embodiment, the upper limit number of sheets is an upper limit value per week. Said differently, the upper limit number of sheets is the upper limit value of the scanned sheets.

On the usage setup screen 560, the current number of sheets (the number of scanned sheets) for each user is also displayed. However, at the time of starting using the service with limited scan usage, the number of the scanned sheets is not administered by the service providing apparatus 30. Therefore, the current number of sheets is set to be "0".

When the upper limit number of sheets is set in the usage setup screen 560 for each user and a setup button 561 is pushed, the browser unit 41 sends a setup request for the upper limit number of sheets designated for each user to the limited service providing unit 31 in step S127. The limited service providing unit 31 stores the upper limit number of sheets designated for each user in the usage state memory unit 32 in response to a receipt of the setup request of the upper limit number of sheets.

FIG. 13 illustrates a structural example of the usage state memory unit. Referring to FIG. 13, the usage state memory unit 32 stores the upper limit number of sheets and the current number of sheets for each user name. As for the newly registered user name, "0" is stored as the current number of sheets. The upper limit number of sheets is initialized at each starting time of each week.

By pushing the setup button 561 of the usage setup screen 560, the usage setup screen 560 superposed and displayed on the service selection screen 540 in the administrator terminal 40 closes and the service selection screen 540 (FIG. 10) returns to an operational object.

For example, when a check button is checked on the service selection screen 540 as illustrated in FIG. 10, the browser unit 41 causes a display device of the administrator terminal 40 to display a collaboration apparatus selecting screen as a popup screen in conformity with a definition of HTML data of the service selecting screen 540.

Figure 14:
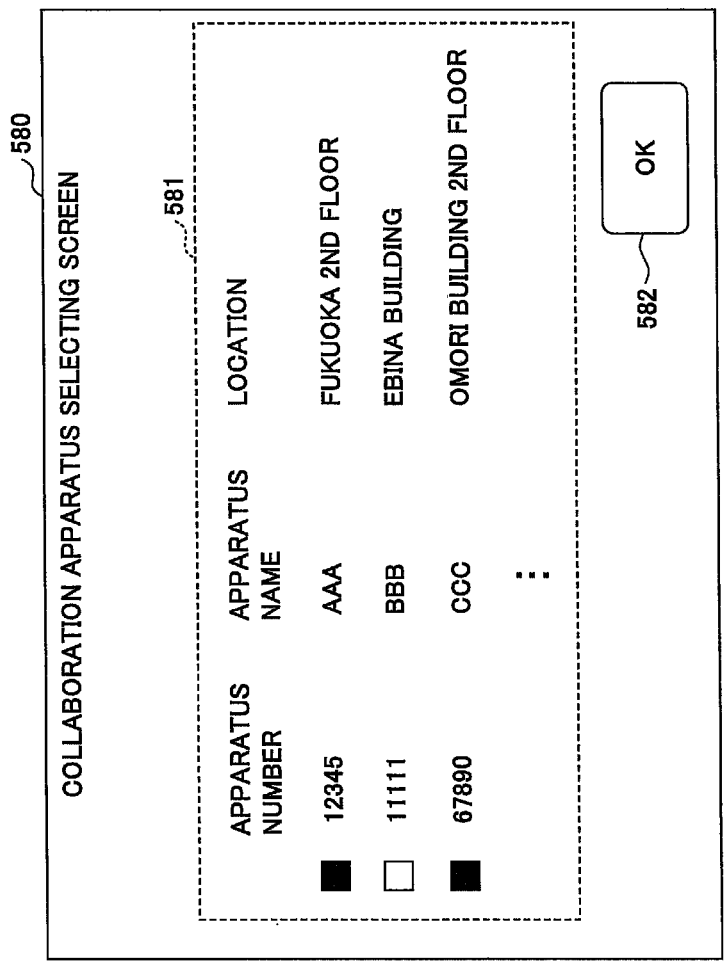
FIG. 14 is an exemplary display on a collaboration apparatus selecting screen.

FIG. 14 is an exemplary display on a collaboration apparatus selecting screen 580. Referring to FIG. 14, the collaboration apparatus selecting screen 580 includes a collaboration apparatus selection area 581, an OK button 582, and so on.

In a collaboration apparatus selecting area 581, an apparatus number, an apparatus name, an installation location, and so on are displayed for each image forming apparatus 10 administered by the administrator. The apparatus information of the image forming apparatuses 10 administered by the administrator is stored in a record containing the administrator name, which is stored in the apparatus information memory unit 234. Said differently, a display content of the collaboration apparatus selecting area 581 is based on the memory content in the apparatus information memory unit 234. The administrator marks a check button on the collaboration apparatus selection area 581 to thereby cause the image forming apparatus 10 corresponding to the check button to be a collaborative object. The administrator may release the mark of the check button to thereby omit the corresponding image forming apparatus 10 from the collaborative object.

When the image forming apparatus 10 to be the collaborative object is selected in the collaboration apparatus selecting area 581 and an OK button 582 is pushed, the collaboration apparatus selecting screen 580 closes and the service selection screen 540 becomes an operational object.

For example, if the OK button 543 of the service selection screen 540 is pushed under a state illustrated in FIG. 10 (step S131 of FIG. 8), the browser unit 41 sends a usage request for service including a service name ("ScanStop") marked (selected) in the service selection screen 540 and an apparatus number marked (selected) in the collaboration apparatus selecting screen 580 to the collaboration setup unit 222 in step S132.

The Ok button 543 may be pushed while the check button 542a is marked on the service selection screen 540 in FIG. 10 in step S131. In this case, the browser unit 41 sends an add request including the service name marked (selected) in the service selection screen 540 and the apparatus numbers of all the image forming apparatuses 10 administered by the administrator to the collaboration setup unit 222 in step S132. The apparatus numbers of all the image forming apparatuses 10 administered by the administrator are acquired from the apparatus information memory unit 234 at the time of generating the HTML data of the service selection screen 540 and recorded in the HTML data.

When the collaboration setup unit 222 of the service intermediation apparatus 20 receives a usage request of a service from the browser unit 41, the service name and one or more apparatus numbers, which are designated in the usage request, are associated and stored (registered) in the collaboration information memory unit 232 in step S133.

FIG. 15 illustrates an exemplary structure of a collaboration information memory unit. Referring to FIG. 15, the collaboration information memory unit 232 stores the apparatus number, the service name, and so on.

The apparatus number is of the image forming apparatus 10 collaborating with the subscription service. The service name is of a service collaborating with the image forming apparatus 10. The service with limited scan usage is associated with the image forming apparatus 10, which is provided with the service, by the collaboration information memory unit 232.

If plural service names are designated to the same apparatus number, a record may be stored for each service name. A record may be stored for each service name in one record corresponding to the apparatus name.

Subsequently, the collaboration setup unit 222 designates one or more apparatus numbers designated in the service usage request and requests for delivery of a Web plugin to the image forming apparatus 10 related to the apparatus number to the intermediation unit 223 in step S134. In the delivery request, the Web plugin name "ScanStopD" is designated as the usage plugin name corresponding to the service having the service name "ScanStop" designated by the service usage request. The usage plugin name can be acquired from the service information memory unit 233 based on the service name.

The intermediation unit 223 stores the contents of the delivery request for Web plugin in the plugin state information memory unit 236.

FIG. 16 illustrates an exemplary structure of a plugin state information memory unit. Referring to FIG. 16, the plugin state information memory unit 236 has items such as a Web plugin name, an apparatus number, a state and so on.

The Web plugin name is of the Web plugin, which is an object of installation. The apparatus number is of the image forming apparatus 10 at the installation destination of the Web plugin. The state is of the Web plugin in the image forming apparatus 10, and the initial value is "not installed". States at the installation destination are administrated by the plugin state information memory unit 236 for each Web plugin to be installed.

Subsequently, the intermediation unit 223 sends the installation request for the Web plugin to the relay unit 124 of the image forming apparatus 10 related to the apparatus number that is designated by the delivery request for the Web plugin in step S135. In the installation request, the Web plugin name "ScanStopD" designated by the delivery request for the Web plugin, and the IP address of and the port number of the plugin administration unit 224 are designated. Hereinafter, the parameter designated by the installation request for the Web plugin is referred to as "installation information". The intermediation unit 223 refers to the apparatus information memory unit 234 to specify the identification information (e.g., an IP address and a port number) for communication of the image forming apparatus 10 corresponding to the apparatus number.

FIG. 17 illustrates an exemplary structure of an apparatus information memory unit. Referring to FIG. 17, the apparatus information memory unit 234 stores the apparatus number, the apparatus name, an installation location, an IP address, a port number, an administrator name, and so on for each image forming apparatus 10. Within the embodiment, these items form the apparatus information.

The apparatus name is such as a host name of the image forming apparatus 10. The installation location is a character string indicative of the installation location of the image forming apparatus of the image forming apparatus 10. The IP address is of the image forming apparatus 10. The port number is of a port which the relay unit 124 opens. The administrator name is of the administrator of the image forming apparatus. The IP address of the second record in FIG. 17 is "FW". "FW" stands for installation of a firewall into the image forming apparatus 10. Said differently, the "FW" means that the image forming apparatus 10 is not externally accessible because the firewall exists. Therefore, in step S135, the installation request of the Web plugin is not sent to the image forming apparatus 10 having the value "FW" of the IP address stored in the apparatus information memory unit 234. This is because the firewall prevents the request (pushing) from being sent from the service intermediation apparatus 20 to the image forming apparatus 10.

The relay unit 124 of the image forming apparatus 10, which receives the installation request for the Web plugin transfers the installation request to the Web starting unit 122 in step S136.

Subsequently, the Web starting unit 122 sends a download request for the Web plugin to the IP address and the port number, which are included in the installation request (said differently, the plugin administration unit 224 of the service intermediation apparatus 20) in step S137. The Web plugin name "ScanStopD" and the apparatus number and so on, which are included in the installation information, are designated in the download request.

The plugin administration unit 224 acquires a file (hereinafter, a "plugin file") in which the Web plugin related to the Web plugin name, which is designated in a download request in response to the download request of the Web plugin, is stored. The plugin administration unit 224 returns the acquired plugin file to the source of a download request in step S138. The plugin administration unit 224 updates information related to the plugin file stored in the plugin state information memory unit 236 (FIG. 16) in response to the return of the plugin file. Specifically, the value of the "state" corresponding to the apparatus number of the image forming apparatus 10 being the source of the download request is updated from "not installed" to "starting installation".

Subsequently, when the Web starting unit 122 of the image forming apparatus 10 receives the returned plugin file, the Web starting unit 122 installs the Web plugin stored in the plugin file into the image forming apparatus 10 to cause the Web plugin to be in a running state in step S139. Within the embodiment, ScanStopD is installed and run.

Subsequently, the Web starting unit 122 sends a report of the state of the Web plugin to the plugin administration unit 224 of the service intermediation apparatus 20 in step S140. The Web plugin name being an object of reporting the state and information indicative of the running state are designated in the report of the state.

The plugin administration unit 224 updates the value of the "state" corresponding to the report of the state to "during start-up" in the plugin state information memory unit 236 in response to a receipt of a report of the state.

Meanwhile, the intermediation unit 223 waits for a receipt of confirmation request of an existence of report information from the image forming apparatus 10 for the image forming apparatus 10 corresponding to the apparatus number of which IP address is "FW", which is correspondingly stored in the apparatus information memory unit 234 among the apparatus numbers designated in the delivery request of the Web plugin in step S134. Said differently, for example, the relay unit 124 of the image forming apparatus of which IP address is "FW" periodically sends a confirmation request for confirming whether report information exists or not to the intermediation unit 223. The apparatus number of the image forming apparatus 10 is designated in the confirmation request for the existence of the report information.

The intermediation unit 223 confirms the existence of the Web plugin name, of which value of the "state" is "not installed" related to the apparatus number designated in the confirmation request with reference to the plugin state information memory unit 236 when the intermediation unit 223 receives the confirmation request of the existence of the report information in step S151. In a case where the corresponding Web plugin name (hereinafter referred to as an "objective Web plugin name") exists, the intermediation unit 223 returns an installation request as a response to the confirmation request of confirming whether the report information exists or not in step S152. The objective Web plugin name and the installation information including the IP address of and the port number of the plugin administration unit 224 are designated in the installation request.

The processes in steps S153 to S157 are similar to the above steps S136 to S140.

As described, the service with limited scan usage is enabled for the image forming apparatus 10 into which the ScanStopD is installed. Next, a process in using the service with limited scan usage is described.

Figure 18:
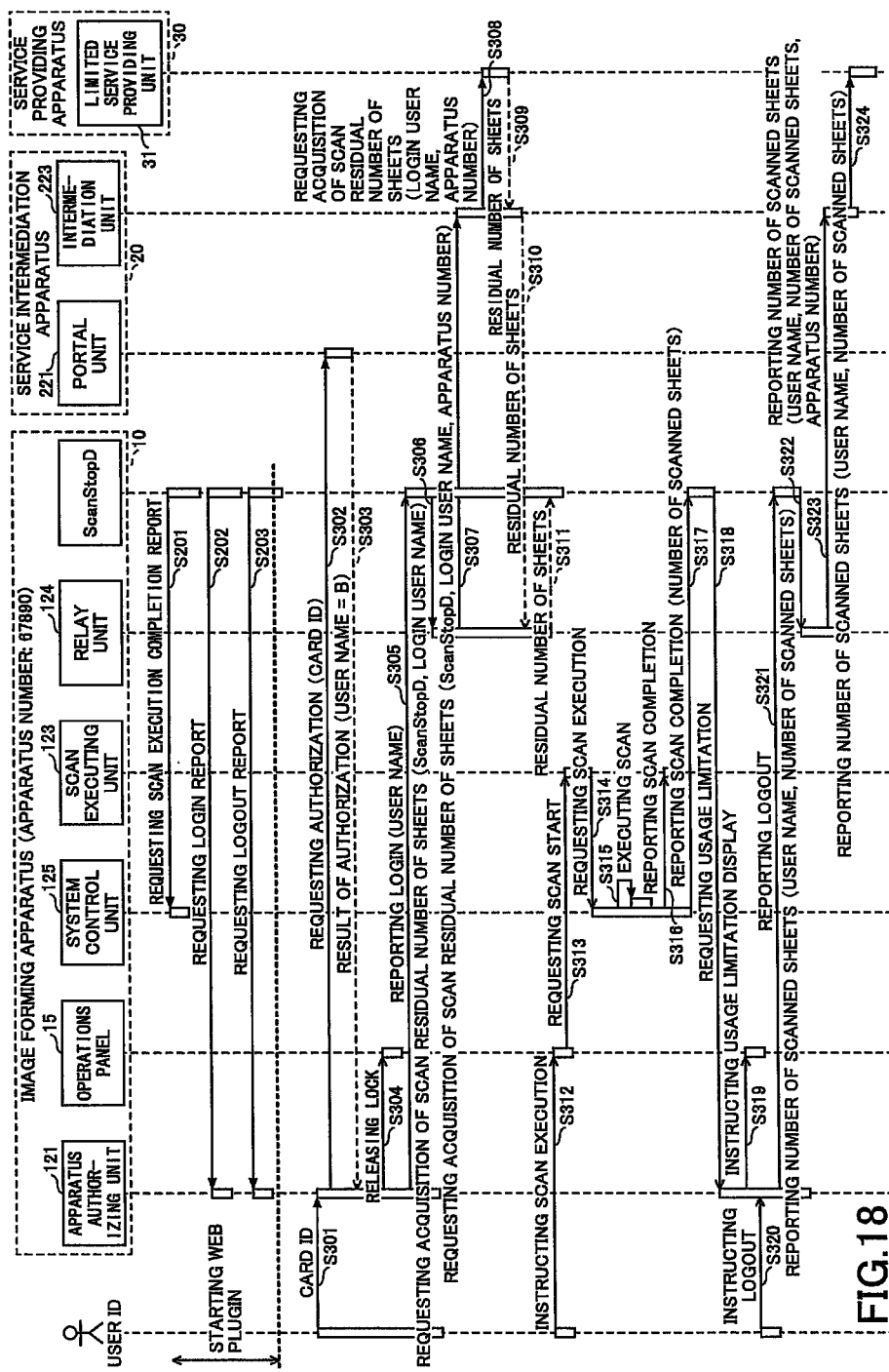
FIG. 18 is the sequence chart for describing an exemplary process performed at a time of using the service with limited scan usage.

FIG. 18 is a sequence chart for describing an exemplary process performed at a time of using the service with limited scan usage.

For example, steps S201 to S203 are processes processed in synchronism with the process causing the ScanStopD to make the CPU 111 run in response to the start-up of the ScanStopD being the Web plugin. Steps S201 to S203 are performed during the start-up of the image forming apparatus 10. Said differently, the Web starting unit 122 causes the Web plugin installed in the image forming apparatus 10 to start up as a process or a thread at a time of starting up the image forming apparatus 10. With the above description, for convenience, the process that is caused the CPU to perform by ScanStopD is described as a process performed by ScanStopD.

In steps S201 to S203, ScanStopD performs the process enabling to detect an event inside the image forming apparatus 10 which itself is required to detect. Specifically, in step S201, ScanStopD carries out a report request for the execution completion event of scan to the system control unit 125. For example, a function as an event handler or an event listener of the execution completion event of the scan is registered in the system control unit 125.

Next, ScanStopD carries out a report request for a login event of a user to the apparatus authorizing unit 121. For example, the function as the event handler or the event listener of the login event is registered in the apparatus authorizing unit 121 in step S202. Next, ScanStopD performs a report request for a logout event of the user to the apparatus authorizing unit 121. For example, the function as the event handler or the event listener of the logout event is registered in the apparatus authorizing unit 121 in step S203. After the completion of the process, ScanStopD waits until the event is reported.

Steps S301 to S324 are performed out of synchronism with the steps S201 to S203.

At a time of starting step S301, the image forming apparatus 10 is in a logout state. In the logout state, the user is not logged in. In the logout state, a message requiring the login (presentation of a card) is displayed on the operations panel 15 of the image forming apparatus 10 wherein the operations panel 15 is locked so as not to be operated.

In step S301, when a user (hereinafter, a "user B") moves a card closer to a card reader connected to the image forming apparatus 10, the apparatus authorizing unit 121 reads a card ID from the card using the card reader. Subsequently, the apparatus authorizing unit 121 sends an authorization request in which the card ID is designated to a portal unit 221 of the service intermediation apparatus 20 in step S302. The portal unit 221 confirms whether or not the card ID designated by the authorization request is stored in the user information memory unit 231. The portal unit 221 determines that the authorization has succeeded in a case where the card ID is stored. In a case where the authorization has succeeded, the portal unit 221 returns a user name "B" stored in the user information memory unit 231 corresponding to the card ID to the apparatus authorizing unit 121 in step S303.

For example, in a case where the returned result of the authorization indicates the success of the authorization, the user name designated in the result of the authorization is stored in the RAM 112 as a login user name. The succeeding process is performed only in a case where the authorization has succeeded.

Subsequently, the apparatus authorizing unit 121 releases locking of the operations panel 15 in step S304. As a result, the operations panel 15 is enabled to be operated. Subsequently, the apparatus authorizing unit 121 reports an occurrence of the login event to ScanStopD by calling a function registered as the event handler or the event listener to the login event in step S305. An argument of the function is designated as the login user name.

In response to the report of the login event, ScanStopD designates the login user name to require acquisition of the number of scanned sheets to the relay unit 124 in step S306. The number of scanned sheets is a residual number of sheets for which scanning is permitted.

Subsequently, the relay unit 124 designates the parameter designated in the request from ScanStopD and additionally the apparatus number of the image forming apparatus 10 to transfer the acquisition request for the residual number of sheets to the intermediation unit 223 of the service intermediation apparatus 20 in step S307.

The intermediation unit 223 determines the transfer destination of the request based on the parameter designated in the request received from the relay unit 124. Specifically, based on the collaboration information memory unit 232 (FIG. 15), the service name of the service is that with which the image forming apparatus 10 on the sending source of the request collaborates. Within the embodiment, the service name of the service with limited scan usage is specified as "ScanStop". However, the image forming apparatus 10 may collaborate with the other services. Therefore, in a case where plural service names are specified, the intermediation unit 223 specifies the service name, which is stored in the service information memory unit 233 (FIG. 6) and corresponds to the Web plugin name "ScanStopD" designated in a request from the relay unit 124 among the plural service names. Within the embodiment, the service name of the service with limited scan usage is specified as "ScanStop". When there are plural service names corresponding to ScanStopD, the service related to the plural service names may be the transfer destination of the request from the relay unit 124.

Subsequently, the intermediation unit 223 transfers the request from the relay unit 124 to a callback URL, which is stored in the service information memory unit 233 and corresponds to the service name specified as the transfer destination of the request in step S308. Within the embodiment, the request is transferred to the limited service providing unit 31 of the service providing apparatus 30.

As described above, a reason why the request (the message) from ScanStopD is transferred to the limited service providing unit 31 via the relay unit 124 and the intermediation unit 223 is that the Web plugin is not always developed while the Web plugin is not always specified to a specific service. Said differently, there may be an existence of the Web plugin which has general-purpose properties to be used by plural types of services. This means that the Web plugin itself does not always know the other side of the communication (service using information from the Web plugin).

Therefore, in order that a message of Web plugin is transferred to an appropriate party on the other side of the communication even if the Web plugin does not now the party on the other side of the communication, the message is transferred from the Web plugin is transferred by the relay unit 124 and the intermediation unit 223.

Said differently, the relay unit 124 has an API (a function) receiving a sending request for which a party on the other side of the communication (a destination) need not to be specified. The Web plugin can request sending of the message by calling the API. Further, the intermediation unit 223 can determine the party on the other side of the communication of the Web plugin as described above. As a result, the message from the Web plugin is transferred to the appropriate party on the other side of the communication.

However, if the party on the other side of the communication is specified in the Web plugin, the Web plugin itself opens a port without a relay through the relay unit 124 and the intermediation unit 223 to enable direct communications between the Web plugin and the side of providing the service. For example, if ScanStopD is a Web plugin peculiar to the service with limited scan usage, there may be a direct communication between ScanStopD and the limited service providing unit 31.

The limited service providing unit 31 calculates the residual number of sheets for a user name being the same as the login user name designated in the request in response to the received residual number of sheets. Specifically, the value obtained by subtracting a current number of sheets from the upper limit number of sheets, which is stored in the usage state memory unit 32 (FIG. 13) and corresponds to the user name, is calculated as the residual number of sheets. The limited service providing unit 31 returns a response including the calculated residual number of sheets to the intermediation unit 223 in step S309.

Subsequently, the intermediation unit 223 returns the response to the relay unit 124 in step S310. The relay unit 124 outputs the response to ScanStopD in step S311. ScanStopD stores the residual number of sheets for the login user, which is included in the response, in, for example, the RAM 112.

Next, the user B sets an original to be scanned in the image forming apparatus 10 to input an execution instruction of scanning via the operations panel in step S312, and a start request for scan is input into the scan executing unit 123 for the operations panel 15 in step S313. The scan executing unit 123 requests of the system control unit 125 execution of scan by designating scan setup information in step S314. The scan setup information is set up on a setup screen related to the scan executing unit 123 which is displayed on the operations panel 15 before step S312. For example, the resolution, the color information, or the like is included in the scan setup information.

Subsequently, the system control unit 125 causes the scanner 12 to scan the original in step S315. After the scan of the original is completed, the system control unit reports the completion of scan to the scan executing unit 123 in step S316. Subsequently, the system control unit 125 reports an occurrence of a scan execution completion event to ScanStopD by calling a function registered as an event handler or an event listener for the scan execution completion event to ScanStopD in step S317. An argument of the function designates the number of scanned sheets. However, the execution completion event may be reported every execution of scan for one page. In this case, it is not necessary to designate the number of scanned sheets.

ScanStopD subtracts the number of scanned sheets included in the report from the residual number of sheets corresponding to the login user name stored in the RAM 112. Further, ScanStopD adds the number of scanned sheets to the number of scanned sheets at a current login. For example, the number of scanned sheets at the current login is initialized to be zero when the residual number of sheets is acquired. In a case where the residual number of the sheets for the login user name becomes 0 or smaller, ScanStopD requests usage limitation to an application, which is currently the operational object, to the apparatus authorizing unit 121 in step S318. An application of the current operational object is provided to cause the image forming apparatus to function as the scan executing unit 123.

Subsequently, the apparatus authorizing unit 121 instructs a screen display for reporting a usage restriction of an application, which is currently an operational object, to display the operations panel 15 in step S319. The operations panel 15 causes the usage limitation screen illustrated in, for example, FIG. 19, to be displayed upon receiving the instruction.

FIG. 19 is an exemplary display of the usage limitation screen. Referring to FIG. 19, it is displayed, in the usage limitation screen 590, that scan cannot be performed because the number of the scanned sheets reaches the upper limit.

Referring to the usage limitation screen 590, a user who has recognized that further scan is not possible inputs a logout instruction by operating the operations panel 15 in step S320. The apparatus authorizing unit 121 reports an occurrence of the logout event to ScanStopD by calling the function registered as an event handler or an event listener for a logout event in step S321.

In response to the logout event, ScanStopD requests for a report of the number of scanned sheets to the relay unit 124 by designating the login user name and the number of scanned sheets at the current login in step S322. Subsequently, the relay unit 124 designates the parameter designated in the request from ScanStopD and additionally the apparatus number of the image forming apparatus 10 to transfer a report request for the number of scanned sheets to the intermediation unit 223 of the service intermediation apparatus 20 in step S323.

The intermediation unit 223 judges the transfer destination of the request from the relay unit 124 in a procedure similar to step S308. Therefore, the transfer destination is determined to be the limited service providing unit 31 of the service providing apparatus 30. Then, the intermediation unit 223 transfers a request for the relay unit 124 to the limited service providing unit 31 in step S324.

The limited service providing unit 31 updates the current number of sheets corresponding to the user name being the same as the login user name designated in the report request stored in the usage state memory unit 32 in response to the report request for the number of scanned sheets. Specifically, the number of the scanned sheets designated in the report request for the number of scanned sheets is added to the current number of sheets.

As described, within the embodiment, the Web plugin suitable for providing the service with limited scan usage is automatically installed in requiring a usage of the service with limited scan usage concerning the image forming apparatus, which is provided via the network like a cloud service. By the collaboration between the Web plugin and the limited service providing unit 31, the service with limited scan usage is realized. As a result, a new mode of the collaboration between the service and the apparatus, which is provided via the network, can be provided.

Specifically, because the current number of sheets for each user, the upper limit number of sheets, or the like is administrated in the service providing apparatus 30, it is possible to impose a usage limitation on each user in using a group of the image forming apparatuses 10 in a circumstance covering a broad area such as the Internet. For example, it is possible to apply a usage limitation to the use of an image forming apparatus 10 installed in Tokyo central office and a usage limitation to the use of an image forming apparatus 10 installed in Osaka branch office.

When ScanStopD being the Web plugin is installed in the image forming apparatus 10 and the number of scanned sheets is compared to the residual number of sheets by ScanStopD, the usage limitation of the scan function (a scan application) can be immediately performed in the image forming apparatus 10. Further, because it is unnecessary to report scan execution by a unit of a sheet, it is possible to restrict communication traffic between the image forming apparatus 10 and the service providing apparatus 30 to be of actually applicable value.

Although an example of limiting the number of scanned sheets is described, it is also possible to limit the number of printed sheets, the number of copied sheets, the number of sheets for sending and receiving FAX, or the like can be restricted. The embodiment may be applied to an apparatus or a system such as a projector, a smart phone, a mobile phone, a digital camera, a meeting system, or the like, other than the image forming apparatus 10. In this case, the use of the apparatus may be limited based on a parameter indicative of the usage amount of the apparatus. For example, the parameters indicative of the usage amount may be a display time for the projector and a communication time for a meeting system. Within the embodiment, the number of scanned sheets is an example of the usage amount of the apparatus.

The usage of the apparatus may be limited to a unit of a user or a unit other than the user. For example, the usage of the apparatus may be limited to a group comprising plural users who are not identified. Since the various units are applicable, the usage is limited to the apparatus regardless of the users. In this case, the upper limit value may be set for each body of the apparatus or each upper limit value may be set for plural apparatuses.

The usage of the apparatus may not be limited based on the usage amount. For example, the usage of the apparatus may be limited based on another concept such as a usage period or the like.

The service provided using the structure of the embodiment is not limited to the limitation of the usage of the apparatus. If it is a service, which is provided based on the information related to the apparatus and acquired by the Web plugin installed in the apparatus, various services can be provided using the structure of the present embodiment.

For example, the embodiment may be applicable to a service for providing a usage state of an apparatus. Within the embodiment, the contents stored in the usage state memory unit 32 can be published on a predetermined Web site or delivered to a mail address which is previously registered to thereby provide the usage state of scan.

Meanwhile, by causing the Web plugin to send the state information of the apparatus, a service of remotely detecting a failure of the apparatus and maintaining the apparatus depending on the detected failure can be provided.

Further, in the above embodiment, the service intermediation apparatus 20 and the service providing apparatus 30 may be integrated into one computer or may be decentralized into plural computers.

FIG. 20 illustrates an exemplary structure including a service intermediation apparatus formed by plural computers and a service providing apparatus formed by plural computers. FIG. 20 illustrates an example in which function of the service intermediation apparatus 20 is decentralized and realized by plural computers and function of the service providing apparatus 30 is decentralized and realized by plural computers. Referring to FIG. 20, the numbers of computers forming the service intermediation apparatus 20 and the service providing apparatus 30 are respectively four or greater. However, the numbers of computers may be less than four.

When the service intermediation apparatus 20 and the service providing apparatus 30 are integrated into the service intermediation apparatus 20, the functional structure illustrated in FIG. 4 may be hierarchized as illustrated in FIG. 21.

FIG. 21 illustrates a secondary exemplary functional structure of the service intermediation apparatus of the embodiment of the present invention. Referring to FIG. 21, the same reference symbols as those in FIG. 4 are given to the corresponding portions, and explanation of these portions is omitted.

Referring to FIG. 21, software of the service intermediation apparatus 20 is classified into layers of a server application 210, a platform 220, or the like.

The server application 210 is an application program that realizes a service provided by the service intermediation apparatus 20. The service may be realized by the collaboration between the server application 210 and the image forming apparatus 10. The service may be realized by collaboration with another cloud computing service such as an online storage. Within the embodiment, the limited service providing unit 31 is an example of the server application 210.

The platform 220 includes a function commonly used by plural server applications, a basic function used by the plural server applications, or the like. Within the embodiment, the portal unit 221, the collaboration setup unit 222, the intermediation unit 223, the plugin administration unit 224, and so on belong to the platform 220. The functions of various parts of the platform 220 are unveiled by the server application via a platform API 240. Said differently, the server application 210 can use the functions of the various portions within a range unveiled by the platform API 240.

A mode of classifying software and various memory units illustrated in FIG. 21 is an example. It is not necessary that the software and various memory units of the service intermediation apparatus 20 is classified into a hierarchy illustrated in FIG. 21. If an apparatus such as the image forming apparatus 10 can collaborate with the server application 210, a hierarchy relationship or the like of software and the memory unit is not specifically limited.

Referring to FIG. 21, the service provided by the service intermediation apparatus 20 may be used by a portable terminal, a personal computer (PC), a meeting system, an image projecting apparatus, an IC recorder, a digital camera, other new devices, or the like via a network besides the image forming apparatus 10.

Within the embodiment, the collaboration information memory unit 232 is an example of a correspondence information memory unit. The collaboration setup unit 222 is an example of a correspondence setup unit. The intermediation unit 223 is an example of a communication unit. The plugin administration unit 224 is an example of the program administrating unit. The relay unit 124 is an example of a transferring unit.

As a result, a new mode of the collaboration between the service and the apparatus, which is provided via the network, can be provided.

For example, the embodiment of the present invention can provide an non-transitory computer-readable storage medium storing a program for causing a processing unit of an apparatus to perform an information processing method by send information related to the apparatus including:

a first storing step of storing, by a service information memory unit, service identification information identifying a service provided for an apparatus and program identification information for identifying a program required to be installed in the apparatus when the service is provided while the service identification information and the program identification information correspond;

a second storing step of storing, by a correspondence setup unit, the apparatus identification information for identifying the apparatus and the service identification information while the apparatus identification information and the service identification information correspond in a correspondence information memory unit, in response to a receipt of a usage request in which the apparatus identification information and the service identification information are designated;

a communicating step of requesting, by a communication unit, to the apparatus related to the apparatus identification information designated in the usage request, installation of a program related to the program identification information stored in the service information memory unit while the service identification information and the program identification information correspond; and a returning step of returning, by a program administrating unit, the program related to the program identification information designated in the acquisition request, in response to the acquisition request for the program from the apparatus which receives a request for the installation.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an information processing system has been described in detail, it should be understood that various changes, substitutions, and alterations could be made thereto without departing from the spirit and scope of the invention.

This patent application is based on Japanese Priority Patent Application No. 2012-062790 filed on Mar. 19, 2012 and Japanese Priority Patent Application No. 2012-259804 filed on Nov. 28, 2012, the entire contents of which are hereby incorporated herein by reference.

What is claimed is:

1. An information processing system including an apparatus, a service providing apparatus, and an information processing apparatus, which are mutually connected through a network, the information processing system comprising:
- a service information memory unit that stores service identification information identifying a service performed by the service providing apparatus and provided to the apparatus and program identification information for identifying a program that is run by the apparatus for causing the apparatus to output apparatus information related to the apparatus and is required to be installed in the apparatus so that the service is provided, the service identification information and the program identification information being stored to correspond to each other;
- a correspondence setup unit that stores apparatus identification information for identifying the apparatus and the service identification information in a correspondence information memory unit so that the apparatus identification information corresponds to the service identification information, in response to a receipt of a usage request in which the apparatus identification information and the service identification information are designated;
- a communication unit that requests installation, to the apparatus related to the apparatus identification information designated in the usage request, of the program related to the program identification information stored in the service information memory unit and corresponding to the service identification information; and
- a program administrating unit that returns the program related to the program identification information designated in an acquisition request, in response to the acquisition request for the program from the apparatus which receives the request for the installation.

2. The information processing system according to claim 1, wherein the communication unit receives the apparatus information, which is caused by the program to be sent from the apparatus, and transfers the apparatus information to a destination related to the service identification information stored by the service information memory unit while the apparatus information and the identification information correspond.

3. The information processing system according to claim 1, wherein the service identification information and the program identification information are stored in the service information memory unit while the service identification information and the program identification information correspond, in response to a receipt of the service identification information sent from the service providing apparatus for providing the service and the program identification information for identifying the program required to be installed in the apparatus when the service is provided.

4. The information processing system according to claim 1, wherein the program causes the apparatus to perform
- a sending request for sending usage information indicative of a usage amount of the apparatus to the service providing apparatus which provides the service,
- an acquisition of an allowable usage amount for the apparatus calculated by the service providing apparatus for storing an upper limit value of the usage amount based on the usage information, and
- a limitation to a usage of the apparatus exceeding the allowable usage amount.

5. The information processing system according to claim 4, wherein the apparatus includes a transferring unit for transferring the usage information to the information processing apparatus, in response to the sending request, caused to be performed by the apparatus, of the usage information of the apparatus.

6. An information processing apparatus comprising:
- a service information memory unit that stores service identification information identifying a service performed by a service providing apparatus and provided to an apparatus and program identification information for identifying a program that is run by the apparatus for causing the apparatus to output apparatus information related to the apparatus and is required to be installed in the apparatus so that the service is provided, the service identification information and the program identification information being stored to correspond to each other;
- a correspondence setup unit that stores apparatus identification information for identifying the apparatus and the service identification information in a correspondence information memory unit so that the apparatus identification information corresponds to the service identification information, in response to a receipt of a usage request in which the apparatus identification information and the service identification information are designated;
- a communication unit that requests installation, to the apparatus related to the apparatus identification information designated in the usage request, of the program related to the program identification information stored in the service information memory unit and corresponding to the service identification information; and
- a program administrating unit that returns the program related to the program identification information designated in an acquisition request, in response to the acquisition request for the program from the apparatus which receives the request for the installation.

7. The information processing apparatus according to claim 6, wherein the communication unit receives the apparatus information, which is caused by the program to be sent from the apparatus, and transfers the apparatus information to a destination related to the service identification information stored by the service information memory unit while the apparatus information and the identification information correspond.

8. The information processing apparatus according to claim 6, wherein the service identification information and the program identification information are stored in the service information memory unit while the service identification information and the program identification information correspond, in response to a receipt of the service identification information sent from the service providing apparatus for providing the service and the program identification information for identifying the program required to be installed in the apparatus when the service is provided.

9. The information processing apparatus according to claim 6, wherein the program causes the apparatus to perform
- a sending request for sending usage information indicative of a usage amount of the apparatus to the service providing apparatus which provides the service,
- an acquisition of an allowable usage amount for the apparatus calculated by the service providing apparatus for storing an upper limit value of the usage amount based on the usage information, and
- a limitation to a usage of the apparatus exceeding the allowable usage amount.

10. The information processing apparatus according to claim 6,
wherein the apparatus includes a transferring unit for transferring the usage information to the information processing apparatus, in response to the sending request, caused to be performed by the apparatus, of the usage information of the apparatus.

11. An information processing method comprising:
storing, by a service information memory unit, service identification information identifying a service performed by a service providing apparatus and provided to an apparatus and program identification information for identifying a program that is run by the apparatus for causing the apparatus to output apparatus information related to the apparatus and is required to be installed in the apparatus so that the service is provided, the service identification information and the program identification information being stored to correspond to each other;
storing, by a correspondence setup unit, apparatus identification information for identifying the apparatus and the service identification information in a correspondence information memory unit so that the apparatus identification information corresponds to the service identification information, in response to a receipt of a usage request in which the apparatus identification information and the service identification information are designated;
requesting, by a communication unit, to the apparatus related to the apparatus identification information designated in the usage request, installation of the program related to the program identification information stored in the service information memory unit and corresponding to the service identification information; and
returning, by a program administrating unit, the program related to the program identification information designated in an acquisition request, in response to the acquisition request for the program from the apparatus which receives the request for the installation.

12. The information processing method according to claim 11,
wherein the communication unit receives the apparatus information, which is caused by the program to be sent from the apparatus, and transfers the apparatus information to a destination related to the service identification information stored by the service information memory unit while the apparatus information and the identification information correspond.

13. The information processing method according to claim 11,
wherein the service identification information and the program identification information are stored in the service information memory unit while the service identification information and the program identification information correspond, in response to a receipt of the service identification information sent from the service providing apparatus for providing the service and the program identification information for identifying the program required to be installed in the apparatus when the service is provided.

14. The information processing method according to claim 11,
wherein the program causes the apparatus to perform
a sending request for sending usage information indicative of a usage amount of the apparatus to the service providing apparatus which provides the service,
an acquisition of an allowable usage amount for the apparatus calculated by the service providing apparatus for storing an upper limit value of the usage amount based on the usage information, and
a limitation to a usage of the apparatus exceeding the allowable usage amount.

15. The information processing method according to claim 14,
wherein the apparatus includes a transferring unit for transferring the usage information to the information processing apparatus, in response to the sending request, caused to be performed by the apparatus, of the usage information of the apparatus.

* * * * *